US009569349B2

(12) United States Patent  
GadelRab (10) Patent No.: US 9,569,349 B2  
(45) Date of Patent: Feb. 14, 2017

(54) METHOD AND APPARATUS FOR REALLOCATING MEMORY CONTENT

(75) Inventor: Serag M. GadelRab, Kanata (CA)

(73) Assignee: ATI Technologies ULC, Markham, Ontario (CA)

( * ) Notice: Subject to any disclaimer, the term of this patent is extended or adjusted under 35 U.S.C. 154(b) by 1278 days.

(21) Appl. No.: 12/340,120

(22) Filed: Dec. 19, 2008

(65) Prior Publication Data

US 2010/0161923 A1    Jun. 24, 2010

(51) Int. Cl.
```
G06F 12/00    (2006.01)
G06F 13/00    (2006.01)
G06F 13/28    (2006.01)
G06F 12/02    (2006.01)
G06F 12/08    (2016.01)
G06F 12/10    (2016.01)
G06F 1/32     (2006.01)
G06F 12/12    (2016.01)
```
(52) U.S. Cl.
CPC ............... *G06F 12/02* (2013.01); *G06F 1/32* (2013.01); *G06F 12/08* (2013.01); *G06F 12/10* (2013.01); *G06F 12/1027* (2013.01); *G06F 12/0815* (2013.01); *G06F 12/122* (2013.01); *G06F 2212/1028* (2013.01); *G06F 2212/681* (2013.01); *Y02B 60/1225* (2013.01)

(58) Field of Classification Search
CPC ...... G06F 12/02; G06F 12/08; G06F 12/0815; G06F 12/10; G06F 12/1027; G06F 12/122; G06F 1/32; G06F 2212/1028; G06F 2212/681
USPC ........................................................ 711/207
See application file for complete search history.

(56) References Cited

U.S. PATENT DOCUMENTS

| | | | |
|---|---|---|---|
| 5,487,160 A | * | 1/1996 | Bemis ........................ 711/114 |
| 5,535,381 A | * | 7/1996 | Kopper ........................ 710/52 |
| 5,893,155 A | | 4/1999 | Cheriton |

(Continued)

FOREIGN PATENT DOCUMENTS

WO    WO2007/024937 A1    3/2007

OTHER PUBLICATIONS

International Search Report and Written Opinion from Canadian Patent Office; International Application No. PCT/CA2009/001855; dated Feb. 9, 2010.

(Continued)

*Primary Examiner* — Sheng-Jen Tsai  
(74) *Attorney, Agent, or Firm* — Faegre Baker Daniels LLP (57) ABSTRACT

Coherent memory copy logic is operative to copy data from a source memory location to a destination memory location and duplicate a write request to a source memory region to produce a duplicated write request. Coherent memory copy logic is also operative to execute the duplicated write request to copy content from the external memory region to the destination memory region. Power to the source memory can then be reduced to save power while the internal memory is being used. Accordingly, a type of "hardware memory mover" does not require the use of any complex software synchronization and does not result in any service interruption during a memory move. The coherent memory copy logic reallocates the application memory space from, for example, external memory to internal memory within a chip in a manner that is transparent to the application software and the user. Corresponding methods are also set forth.

26 Claims, 5 Drawing Sheets

(56) References Cited

U.S. PATENT DOCUMENTS

| | | | |
|---|---|---|---|
| 6,182,198 B1* | 1/2001 | Hubis et al. | 711/162 |
| 6,243,315 B1* | 6/2001 | Goodman | 365/222 |
| 6,434,681 B1* | 8/2002 | Armangau | 711/162 |
| 6,438,660 B1* | 8/2002 | Reams | 711/143 |
| 6,442,666 B1* | 8/2002 | Stracovsky | 711/206 |
| 6,564,329 B1 | 5/2003 | Cheung et al. | |
| 6,691,245 B1* | 2/2004 | DeKoning | 714/6.31 |
| 6,701,455 B1* | 3/2004 | Yamamoto et al. | 714/18 |
| 6,789,153 B1* | 9/2004 | Stewart | 710/306 |
| 7,085,900 B2* | 8/2006 | Inagaki et al. | 711/162 |
| 7,100,013 B1 | 8/2006 | de Waal | |
| RE39,963 E* | 12/2007 | Cheung et al. | 713/322 |
| 7,590,885 B2* | 9/2009 | Kondo et al. | 714/13 |
| 2002/0069328 A1* | 6/2002 | Chauvel | 711/130 |
| 2003/0177321 A1 | 9/2003 | Watanabe | |
| 2004/0073831 A1* | 4/2004 | Yanai et al. | 714/7 |
| 2004/0221127 A1* | 11/2004 | Ang | 711/203 |
| 2004/0268067 A1* | 12/2004 | Yamagami | 711/159 |
| 2005/0132155 A1* | 6/2005 | Kasako | 711/162 |
| 2005/0251776 A1* | 11/2005 | Hsin et al. | 716/11 |
| 2005/0273654 A1* | 12/2005 | Chen et al. | 714/13 |
| 2006/0031646 A1* | 2/2006 | Maruyama et al. | 711/162 |
| 2006/0236049 A1* | 10/2006 | Iwamura | 711/162 |
| 2007/0028144 A1* | 2/2007 | Graham et al. | 714/34 |
| 2007/0055901 A1 | 3/2007 | Van Der Heijden | |
| 2007/0113044 A1* | 5/2007 | Day et al. | 711/207 |
| 2007/0174584 A1* | 7/2007 | Kopec et al. | 711/207 |
| 2008/0028144 A1* | 1/2008 | Sutoh et al. | 711/114 |
| 2008/0177964 A1* | 7/2008 | Takahashi et al. | 711/162 |
| 2008/0313413 A1 | 12/2008 | Hutner et al. | |
| 2008/0320260 A1* | 12/2008 | Watanabe | 711/162 |
| 2009/0147021 A1* | 6/2009 | Glen | 345/603 |
| 2010/0121824 A1* | 5/2010 | Kawamura et al. | 707/683 |
| 2010/0241765 A1* | 9/2010 | Chikusa et al. | 710/2 |

OTHER PUBLICATIONS

Hennessy, John L.; VLSI Processor Architecture; IEEE Transactions on Computers archive; vol. 33, Issue 12; Dec. 1984.

Japanese Office Action mailed Feb. 12, 2014 in related Japanese Application No. 2012512468A.

Extended Search Report mailed Apr. 8, 2013 from the EPO in related application No. 09832785.1.

* cited by examiner

FIG. 4
CMCE OPERATION

FIG. 5 ns a source and a destination memory  # METHOD AND APPARATUS FOR REALLOCATING MEMORY CONTENT

BACKGROUND OF THE INVENTION

The disclosure relates generally to methods for reallocating memory content from a source memory to a destination memory, and more particularly to methods and apparatus for reallocating memory content between an external memory that is external to an integrated circuit (e.g., chip), and an internal memory located on the chip.

Handheld devices such as smart phones, multimedia players, digital audio players and other handheld devices need to have improved battery life. Low power operation of handheld chips (integrated circuits located within the handheld devices) is essential for long battery life. When these chips initiate an application, such as an audio playback application for example, they try to allocate a memory space for the application within the internal chip-memory structure. If the internal memory structures are already in use by other applications, the chip allocates memory for the new applications memory structures that are external to the chip. However, using external memory increases the power consumption of the handheld device which lowers battery life.

When internal memory on the chip becomes free, current handheld devices are typically unable to move applications from the external memory to internal memory due to the complexity or unreliability of software based migration of memory pages. The device typically therefore continues to use external memory even though internal memory structures are available for use. This can result in an unnecessary consumption of power.

Use of external memory requires external communication pins that may take additional power. If the handheld device enters a low power mode and the application that is executing can reside in internal memory, fewer operations are necessary, but the application normally resides in the external memory. Other systems may allow, for example, all applications that are executing to be moved to internal memory from external memory or maximum number of applications are moved while allowing some minimum number of applications to be executing from external memory. However, these typically employ software synchronization and transfer operations.

In addition, when applications are moved, the operating system stops the application and moves data from external to internal memory. However, the application is stopped so there is an interruption of service for the user which is unacceptable.

One known attempted solution for moving applications between source and destination memory such as an external memory and internal memory, are software based. They typically require complex software synchronization techniques. The software-based transfer operation causes the application to be fully or partially unavailable during the processes of transferring the application. This interruption, no matter how short in duration, would not be acceptable for multi-media applications like audio and video playback.

Known hardware techniques for moving information from external memory to internal memory may include for example a "memory copy engine" or a direct memory access copy engine (DMA engine) that copies data from a source memory to a destination memory are known. The problem with such a copy engine is that any update to a particular location of the source memory that has already been copied to the destination memory will not be reflected in the destination memory. Therefore memory coherence is not enforced.

The application must be stopped while the direct memory access engine is operating so that service is interrupted. In addition, the direct memory access engine is typically not aware of virtual addresses. The software application executing for example, on the host processor tells the direct memory access copy engine to move data. The software application must request translations of virtual to physical memory. Therefore, it is desirable to have a hardware-based system that allows an application to continue running while making a copy or movement of content from source memory to a destination memory.

BRIEF DESCRIPTION OF THE DRAWINGS

The invention will be more readily understood in view of the following description when accompanied by the below figures and wherein like reference numerals represent like elements, wherein.

DETAILED DESCRIPTION OF THE PREFERRED EMBODIMENTS

Generally, as part of a memory copy process, memory copy logic is operative to duplicate a write request to a source memory region to produce a duplicated write request. Coherent memory copy logic is also operative to execute the duplicated write request to ensure that any content that the write requests updates in the source memory is also updated in the destination memory. Power to the source memory can then be reduced to save power while the internal memory is being used. Accordingly, a type of "hardware memory mover" does not require the use of any complex software synchronization and does not result in any service interruption during a memory move. The coherent memory copy logic reallocates the application memory space from, for example, external memory to internal memory within a chip in a manner that is transparent to the application software and the user. Another example of providing coherency when moving data from a source region to a destination region includes the use of the coherent memory copy engine to relocate the contents of one region of memory to a new location (region) within the same physical memory (e.g. not internal and external memories). This allows consolidation of memory regions that may have been fragmented during the normal operation of the device. Other advantages will be appreciated by those having ordinary skill in the art.

The coherent memory copy logic may include input request router logic that intercepts memory write requests for the source memory region being copied to a destination memory region, along with copy write controller logic that is operative to compare an address of the intercepted memory write request with entries in a pending data queue to facilitate copy coherency. The pending data queue temporarily stores data to be copied from the external memory source region and data representing that an entry in the pending data queue is ready to be copied to the internal memory. Each entry in the pending data queue temporarily stores a data fragment that is read from the source memory but not yet written to the destination memory. The pending data queue also includes data associated with the data fragment being copied to the destination memory region. Such associated data may include the physical addresses of the data fragment in the source and destination memories, a flag indicating that this data fragment is ready to be written in into the destination memory and a discard flag to indicate that this data fragment should be discarded.

In another example, the coherent memory copy logic includes an internal translation look aside buffer that stores a subset, such as fewer than all translations for all pages, or a modified subset of information from an external translation look aside buffer located in the external or source memory that contained physical addresses. The external TLB is modified to point to the internal locations instead of the external locations. Memory controller block memory interfaces 116 and 110 uses the internal translation look aside buffer 136 to translate physical addresses and virtual addresses for only pages stored in the internal memory.

A handheld device including an integrated circuit as well as corresponding methods are also described below.

Figure 1:
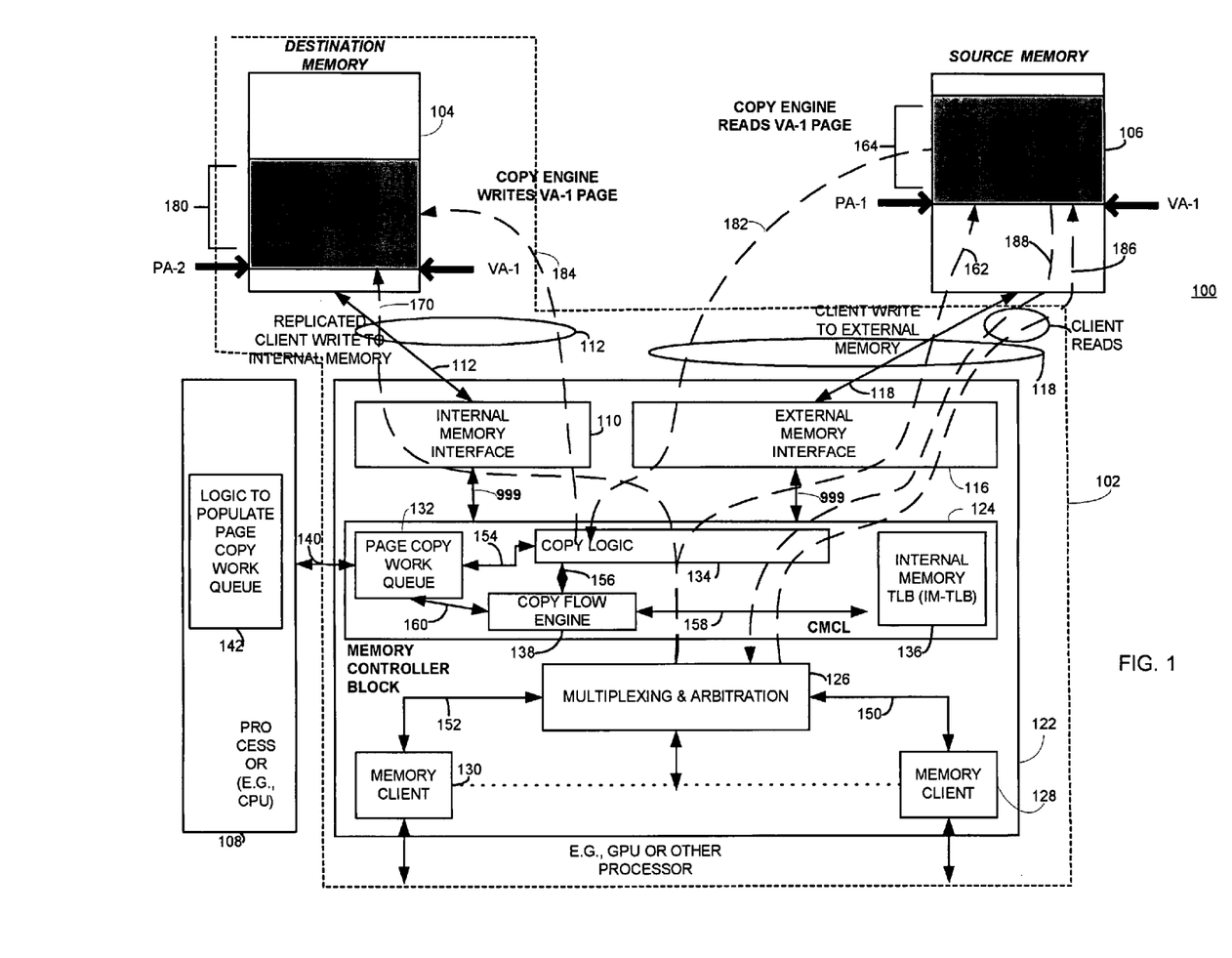
FIG. 1 is a block diagram illustrating one example of portions of an integrated that include logic operative to move memory content in accordance with one example set forth in the disclosure.

FIG. 1 illustrates one example of a portion of a handheld device 100 such as, but not limited to, a smart phone, that although not shown includes standard components such as a display, wireless cellular subsystem, camera and other known components. FIG. 1 illustrates a processor 102 such as a graphics processing unit including destination memory 104 which is internal memory to the processor 102, such as but not limited to a micro-processor integrated circuit 102. Also shown is source memory 106 that may be, for example, dynamic RAM (DRAM) and the destination memory 107 may be SRAM, however it will be recognized that any suitable memory type may also be used. The source memory 106 is shown as external memory that is external to the integrated circuit 102. The handheld device 100 may also include another processor 108 such as a central processing core which may be on the same integrated circuit or a separate integrated circuit. The processor 102 includes internal memory interface 110 that communicates via a suitable bus 112 to the internal memory 104 and also includes an external memory interface 116 that communicates with external memory 106 via suitable bus 118. For purposes of illustration only, individual communication paths are also shown within ovals that are communicated via the bus 112 and bus 118. The processor 102 also includes as part of a memory controller block 122, or as separate blocks, coherent memory copy logic 124, multiplexing arbitration logic 126 and one or more memory clients 128, 130 that communicate with other clients and circuits within the processor 102.

The coherent memory copy logic 124 is hardware logic that includes a page copy work queue 132, copy logic 134, an optional internal memory translation look aside buffer 136 and a copy flow engine 138. The coherent memory copy logic 124 communicates with the processor 108 via suitable communication bus 140. The processor 108 as further described below may include a suitable program that is executed that serves as logic 142 that is operative to populate the page copy work queue 132. The multiplexing and arbitration logic 126 communicates with the various client interfaces 128-130 via suitable buses 150 and 152 as known in the art.

The copy engine 134 is operatively coupled to communicate with the page copy work queue 132 through suitable link 154, and with copy flow engine 138 through suitable link 156. The copy flow engine 138 (e.g., a state machine) communicates with the internal memory TLB 136 through suitable communication link 158 and with the page copy work queue through link 160. The internal memory TLB 136 communicates with the different memory interfaces (internal and external) through suitable communication link 999.

Figure 2:
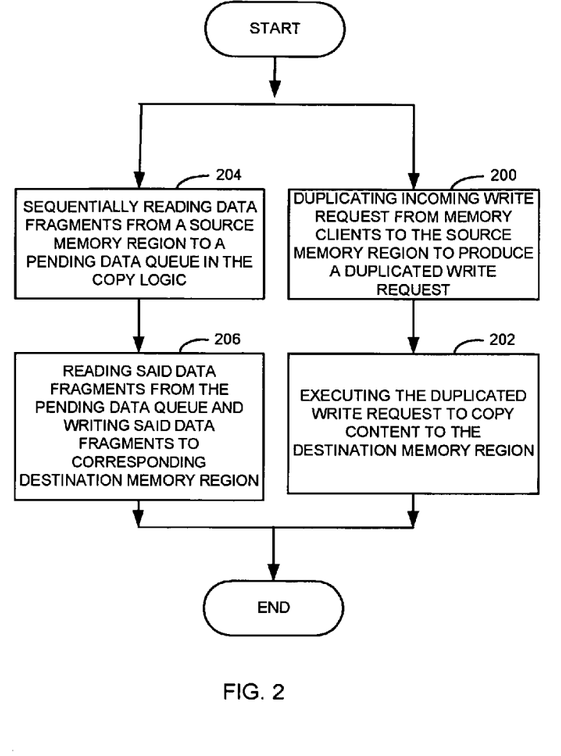
FIG. 2 is a flowchart illustrating one example of a method for reallocating memory content in accordance with one example set forth in the disclosure.

Referring also to FIG. 2, in operation, the coherent memory copy logic 124 is operative to copy data from one memory location to another memory location (see blocks 204 and 206). By way of example only, copying may include sequentially reading data fragments from a source memory region 164 using read requests 182 and writing the data fragments into a destination memory region 180 using write requests 184. This is shown in blocks 204 and 206. The coherent memory copy logic 124 is also operative to duplicate a write request 162 from any of the memory clients 130-128 that indicates a write to source memory 106, for example to write to a region 164 which may be for example a page from memory, to produce a duplicated write request 170 to write to a corresponding destination memory region 180 in the destination memory 104. This is shown in block 200. Line 163 represents reads. As shown in block 202, the coherent memory copy logic 124 is also operative to execute the duplicated write request 170 to copy content from the source memory 106 to the destination memory region 180 in destination memory 104. Link 171 represents reads and writes during normal operation. For all read and write requests the copy logic 134, also referred to as a copy engine, can operate on either virtual addresses (denoted by VA in FIG. 1) or physical addresses (denoted by PA in FIG. 2). If the memory clients 128-130 or the page copy work queue 132 provided physical addresses, then the copy logic 134 uses the physical addresses as they are provided. If the memory clients 128-130 or the page copy work queue 132 provide virtual addresses, the copy logic 134 will translate the virtual addresses to physical addresses. Those skilled in the art will recognize the many well developed and understood methods for translating translation between virtual and physical addresses in a memory. In addition, lines 186 shows a memory client request to read information from the source memory and the source memory 106 providing the information shown by line 188 referenced as client reads. In this example, the coherent memory copy logic 124 operates to provide continuous read and write access to the external memory 106 while copying data fragments, where the sum of these fragments form one or more memory pages, from the source region to an destination memory region 180 by the use of its copy function and by generating and utilizing the duplicated write request 170. This is done without stopping the operation of an application executing on the processor 108.

To perform coherent copies of memory pages from the source memory 106 to destination memory 104, the coherent memory copy logic 124 for example receives a command from an application executing on processor 108 via the page copy work queue 132. The memory page may have a virtual base address of VA-1 as shown which corresponds to the physical base address PA-1. Alternatively the processor 108 may provide the physical base address PA-1 of the page. The processor 108 may also provide the base addresses of several pages that are to be copied (VA-11, VA-111 . . . etc. or PA-11, PA-111 . . . etc.) through the page copy work queue 132. For each memory page that is to be copied from a source memory, the processor 108 also provides either the base address of the destination memory region to which the coherent copy engine will copy the data currently located in t the source memory. The base address of the destination memory region can either be physical (PA-2) or virtual address (VA-2). This receiving of the command can also happen through a queue within the page copy work queue 132 or through a simple register based command. The copy flow engine 138 reads the content of the page copy work queue 132 and issues copy commands to the copy logic 134 through the appropriate bus 156. The copy logic 134 copies the page whose base address is PA-1 and writes it to the page whose base is PA-2 while maintaining coherency during the copy operation. Coherency should be maintained during the page copy operation in a manner that is transparent to all client blocks. This is further set forth below.

In addition to or optionally, maintenance of an internal memory translation look aside buffer 136 that can translate between virtual addresses and physical addresses, or that can translate between one physical address and another physical address, may also be employed. For example, where virtual to physical page translation tables are stored in external or source memory, a challenge is provided since the external memory must remain accessible to memory access units for virtual address to physical address translation even after required pages are transferred to the internal memory. In a mode where internal memory only (IMOM) is used, the maintenance of an internal memory TLB for internal memory pages only is employed.

Figure 3:
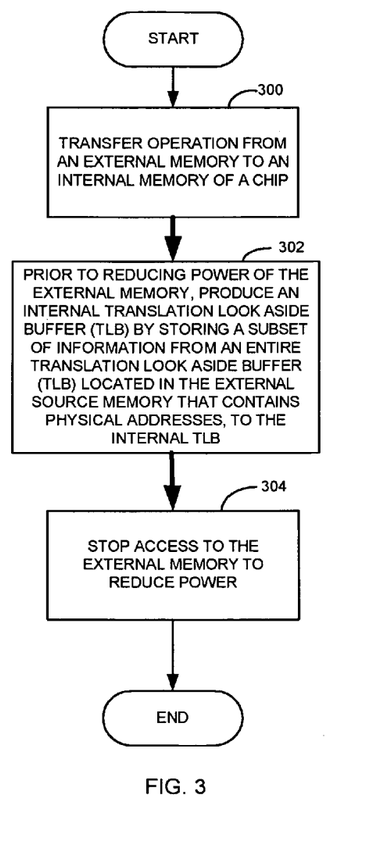
FIG. 3 is a flowchart illustrating one example of a method for reallocating memory content in accordance with one example set forth in the disclosure.

Referring to FIG. 3, the method of maintaining an internal memory TLB and reducing power to allow internal memory pages to be employed, includes, as shown in block 300, transferring operation from an external memory or source memory to the internal memory of the processor 102. As shown in block 302, this method includes prior to reducing power of the source memory 106, producing an internal translation look aside buffer 136 by storing (e.g., copying) a subset of information from an entire translation look aside buffer located in the external source memory that contains the physical addresses, to the internal translation look aside buffer. This may be done, for example, by the copy logic 134. The memory interface 110 and 118 uses the internal TLB 136 to translate addresses from the memory clients 128-130 for only pages stored in the internal memory. This may be done, for example, under control of the software module executing as logic 142. The internal memory TLB may be constructed by logic 142 prior to entering into the internal memory only mode. The physical size of the internal memory TLB is a function of the size of the internal memory but is typically an order of magnitude smaller than the size of the internal memory. The internal memory TLB 136 is therefore a scalable solution that allows for the turning off and hence power savings provided by the shutting off of the external memory 106.

As shown in block 304, the method may then include stopping access to the external memory 106 to reduce power. Placing the source memory in a low power mode includes placing the source memory in the self refresh mode or removing power from the source memory.

Further operation by the application is done solely through use of internal memory 104. The internal memory TLB 136 may be a separate piece of RAM from the internal memory 104 or may be a portion of memory therein. However, the internal memory translation look aside buffer 136 is preferably in an SRAM to reduce overall power. Stopping access to the source memory 106 shown in block 304 allows the reducing of power consumption of the source memory 106. The source memory is then placed into low power mode, as known in the art. This may be done, for example, by the processor 102 or processor 108 or other suitable power control module. The internal memory translation look aside buffer 136 may be created as a binary or M-ary search tree. The structure can be searched using a simple hardware base approach. The M-ary search tree can benefit from wide RAM interfaces to reduce search time. Alternatively, the IM TLB 136 may be a hash table. When in the internal memory mode only, the internal memory interface 110 issue search commands to the TLB by providing the addresses of incoming transactions. The internal memory TLB 136 performs a search of its contents and returns the corresponding address in the internal memory 104. However, one less desirable result of using a hash search method may be collision in the hash tables. Such collisions can produce a long search duration and potentially complicate the actual construction of the table. Accordingly, a search tree approach may be more desirable.

Figure 4:
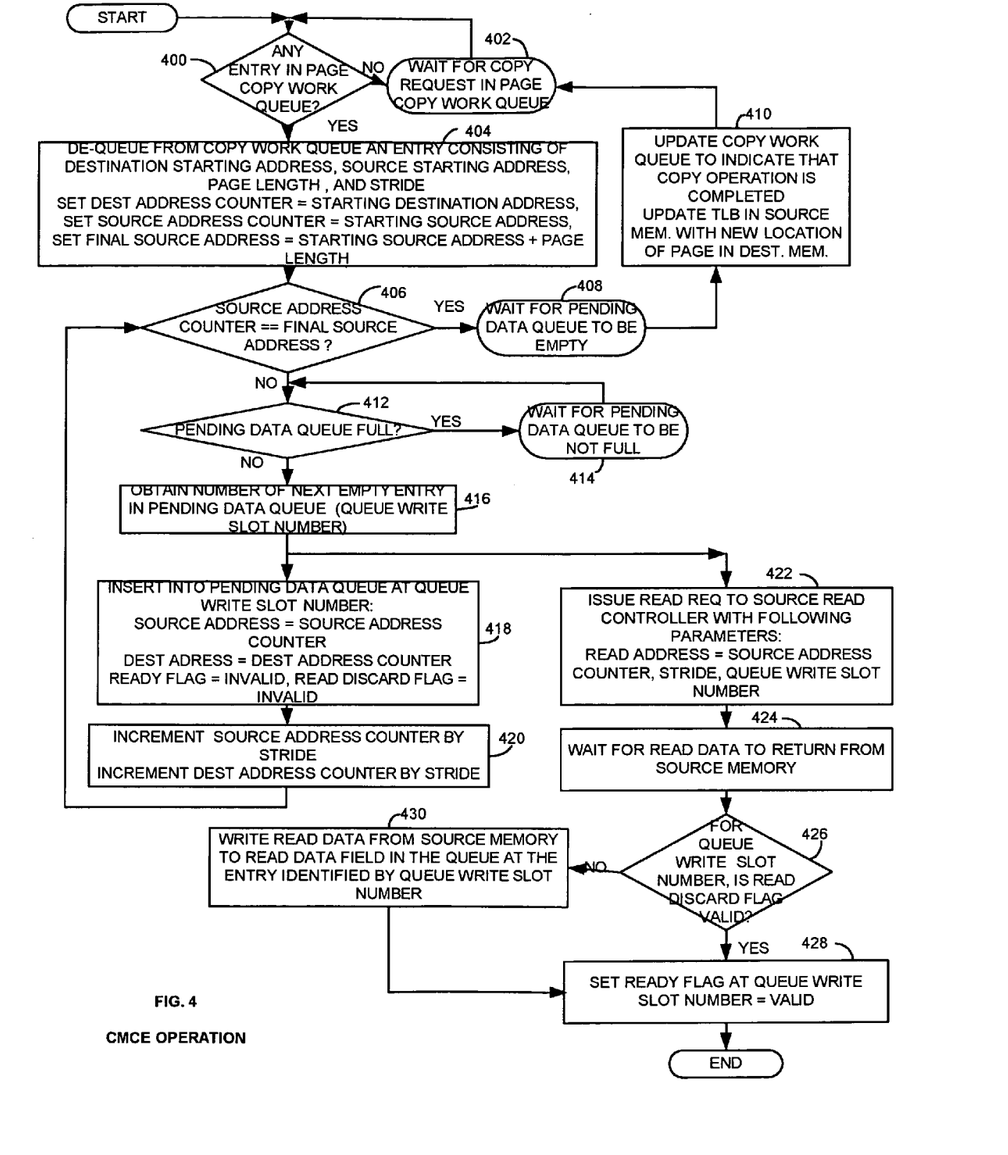
FIG. 4 is a flowchart illustrating one example of a method for reallocating memory content in accordance with one example set forth in the disclosure.
Figure 5:
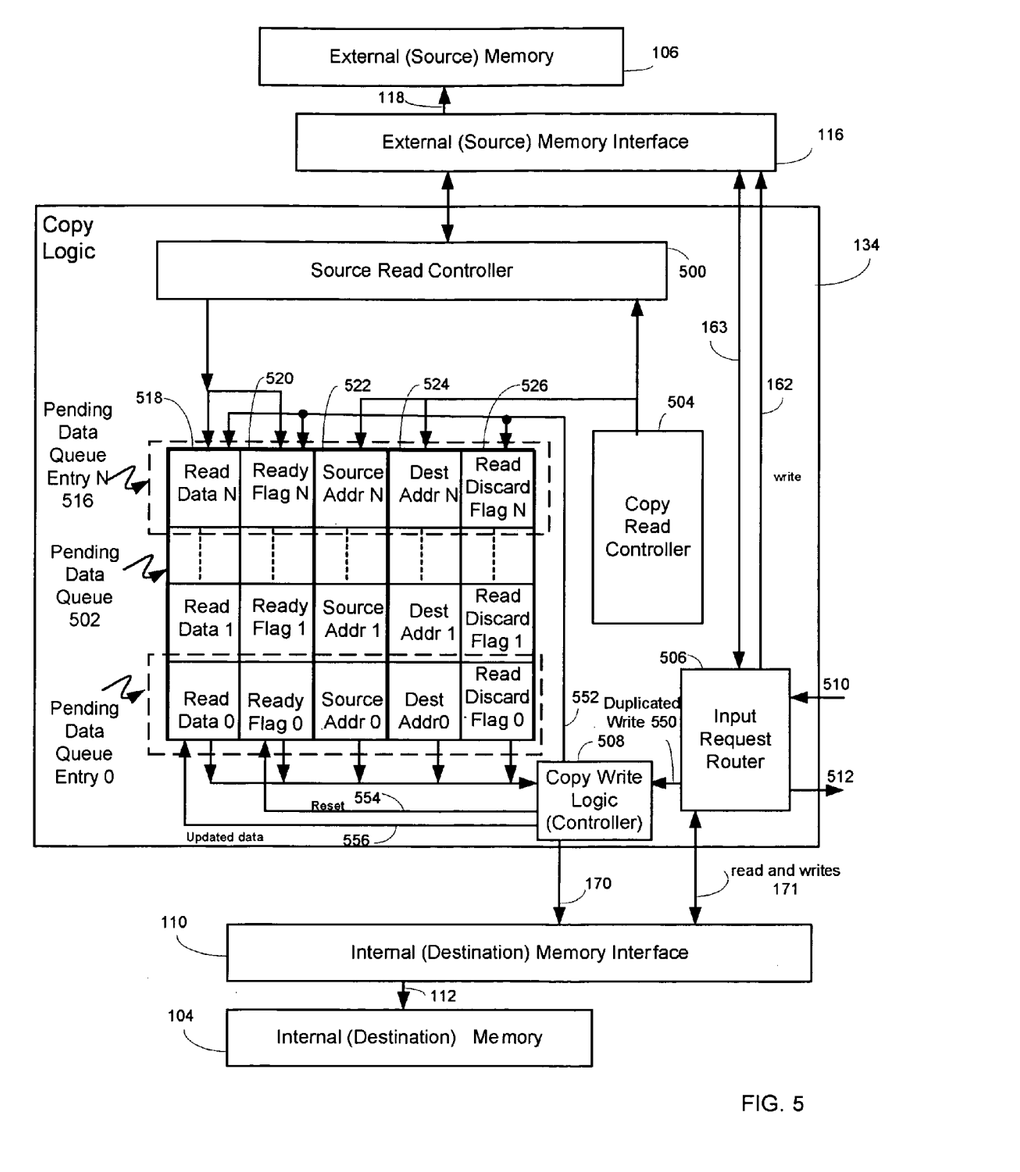
FIG. 5 is a block diagram illustrating one example of a copy engine set forth in FIG. 1 in accordance with one example set forth in the disclosure.

Referring back to duplicating write requests and the operation of the coherent memory copy logic 124 in connection therewith, reference will be made to FIGS. 4-7. FIG. 5 illustrates one example of copy logic 134 that includes a source read controller 500, a pending data queue 502 that is coupled to the source read controller, a copy read controller 504 is also coupled to the pending data queue and to the source read controller, an input request router 506 coupled to the external source memory interface 116 and to a copy write controller 508 and an internal memory interface 110. The input request router 506 processes requests external to the copy logic 134 such as read or write requests from the memory clients 128-130 outside the copy logic 134 and provides the read response using appropriate buses such as 510 and 512. The pending data queue 502 includes memory structured as data queue entries 516. Each of the data queue entries contains data representing read data 518, ready flag 520, source address 522, a destination address 524 and a read discard flag 526.

Referring again to FIGS. 1, 4 and 5, a method for transferring content from a source memory, such as an external memory, and a destination memory region or memory such as an internal memory 104 will be described. As shown in block 400, a determination is made as to whether any entries in the page copy work queue 132 exist. This may be done for example by the copy flow engine 138. If no entries are pending in the page copy work queue 132, the process includes waiting for a copy request from a source memory location to a destination location to be pending in the page work copy queue 132, such as a page copy request. This is shown in block 402. If a page copy request is in the page copy work queue 132, the method includes processing the request by, for example, dequeuing and entry from the queue. An entry in the page copy work queue 132 may include a destination starting address, a source starting address, a page length and stride. This is shown in block 404. This process may also include setting the destination address counter to the starting destination address, setting a source address counter to a starting source address and setting a final source address to the starting source address plus the page length. This may be done, for example, by having the copy flow engine 138 set the values of these counters in the copy read controller 504. In addition to the entry information described, the entry may also include the number of reads per read requests if desired.

As shown in block 406, the method includes determining if the source address counter is equal to the final source address counter. This may be done by the copy read controller 504. If the source address counter equals the final source address, the method includes, as shown in block 408, waiting for the pending data queue to be empty. Once empty, the method includes, as shown in block 410, updating the copy work queue 132. This can be done by the copy flow engine 138 whenever it is notified of the copy completion by the copy logic 134. Also as shown in 410, the method includes updating the translation look aside buffer in the source memory with the new location of the page in the destination memory. This operation can be done by the copy flow engine 138 or by the processor 108.

Referring back to block 406, if the source address counter is not equal to the final source address, the method includes determining if the pending data queue 520 is full as shown in block 412. If the pending data queue 502 is full, the method includes as shown in block 414, waiting for the pending data queue to not be full. If the pending data queue 502 is not full as shown in block 416, the method includes obtaining the number of the next empty entry in the pending data queue such as a queue write slot number. This can be performed by the copy read controller 504. As shown in block 418, the method includes inserting into the pending data queue 502 at a queue entry, which is marked by a number known as the write slot number, source address to be equal to the source address counter, the destination address to be equal to the destination address counter, the ready flag to be set to invalid and the read discard flag set to invalid. As shown in block 420, the method includes incrementing the source address counter by the stride amount and incrementing the destination address counter by the stride. Blocks 418 and 420 may be carried out for example by the copy flow engine 138 and more particularly by the copy read controller 504. The process then continues to block 406.

In addition, the method includes as shown in block 422, after obtaining the number of the next empty entry in the pending data queue, the write slot number, to issue a read request to the source read controller 500 with certain parameters. These parameters include the read address to be equal to the source address counter, the stride and the queue write slot number. As shown in block 424, the method also includes waiting for the read data to return from the source memory 106. This may be done for example by the source read controller 500. As shown in block 426, the method includes determining, for a queue write slot number, whether the read discard flag is valid. If the read discard flag is valid, the method includes setting the ready flag at the corresponding queue write slot number to be valid as shown in block 428. However, if the read discard flag is not valid, the method includes, as shown in block 430, writing the read data from the source memory to the read data field in the pending data queue at the entry identified by the queue write slot number. The process then continues to block 428.

Figures 6, 7:
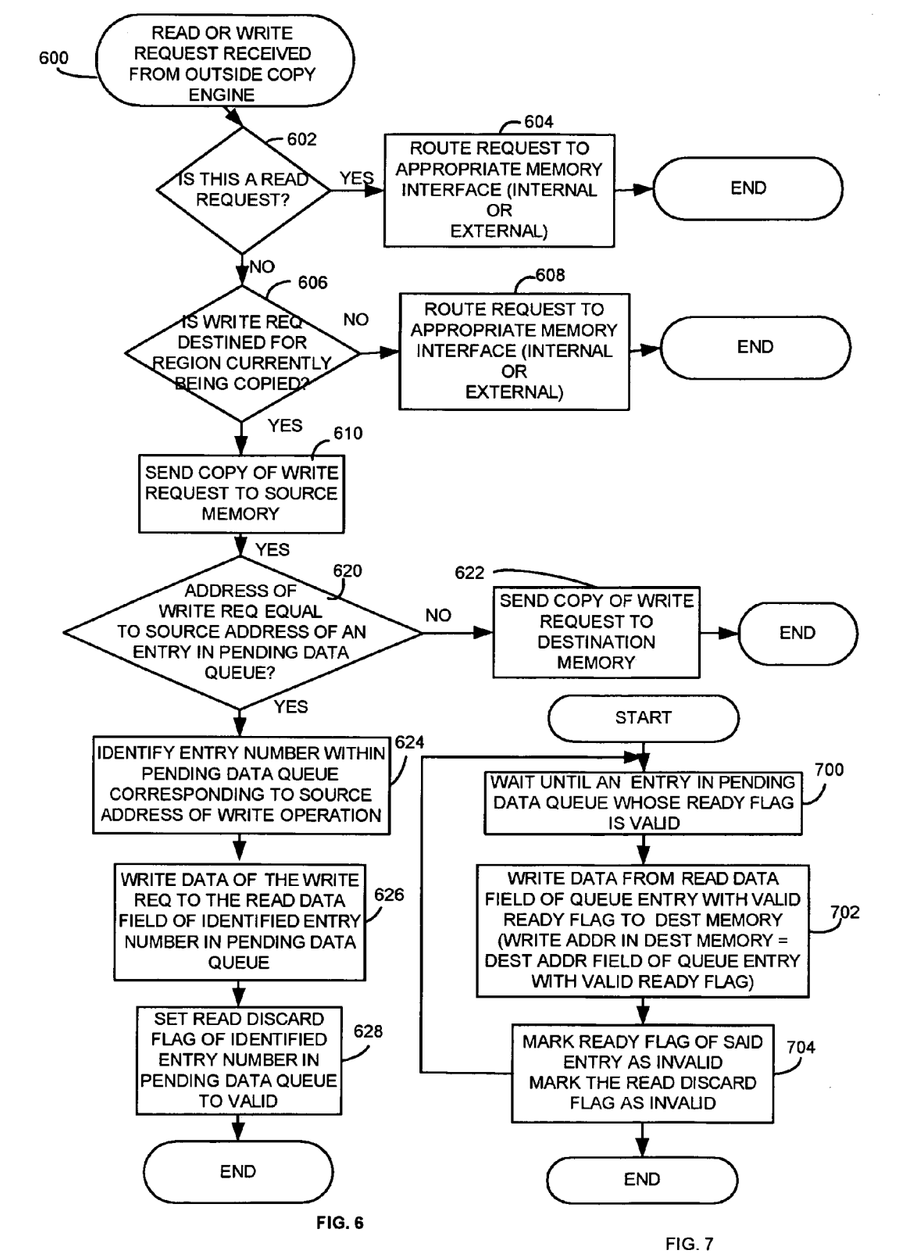
FIG. 6 is a flowchart illustrating one example of a method for reallocating memory content in accordance with one example set forth in the disclosure.
FIG. 7 is a flowchart illustrating one example of a method for reallocating memory content in accordance with one example set forth in the disclosure.

Referring to FIG. 6, a method of maintaining a coherent view of the contents in both the source and destination memory while performing the copy operation outlined in FIG. 4 will be described. As shown in block 600, once a read or write request is received from outside the copy engine 134, the method as shown in block 602 includes determining whether the request is a read request. This determination can be performed by the input request router 506. If so, the read request is routed to the appropriate memory interface, either the internal or external memory interface, as shown in block 604. In this example, all memory access requests pass through the copy logic 134 and they are examined by the input request router 506 and the address location is compared to the region currently being copied.

The input request router 506 intercepts memory write requests, as shown in block 606 where the request is a write request. The input request router 506 intercepts the memory write requests for the external memory region (or source region) being copied to the internal destination memory region. If the write request is not destined for a region currently being copied, the write request is routed to the appropriate memory interface as shown in block 608. The intercepted memory request is intercepted for the region being copied from the source memory to the destination memory. If the write request therefore is destined for the region currently being copied as shown in block 610, the method includes sending the write request to the source memory namely write copy request 162. As such, the original write request is sent to the source memory. The input request router 506 provides data 550 to the copy write controller 508 indicating that a duplicate write request is needed. As shown in block 620, the method includes a type of in flight operation coherence check which includes determining whether the address of the write request is equal to the source address of an entry in the pending data queue where its ready flag is set to zero. If not, then the method includes as shown in block 622, sending a copy of the write request to the destination memory by the copy write controller 508 shown as 170.

If the address of the write request is equal to the source address of an entry in the pending data queue, the method continues as shown in block 624 where the copy write controller identifies the entry number within the pending data queue 502 corresponding to the source address of the write operation. As shown in block 626, the method includes writing data of the write request to the read data field of the identified entry number in the pending data queue which is carried out by the copy write controller 508. As shown in block 628, the method includes the copy write logic 508 setting the read discard flag via signal 552 of the identified entry number in the pending data queue to be valid. As such, the source read controller is prevented from writing into the pending data queue for that entry. FIG. 7 illustrates one example of a method for removing data from the pending data queue 502 which may be carried out in this example by the copy write logic 508. As shown in block 700, the method includes waiting until an entry in the pending data queue 502 has a ready flag being set as valid. As shown in block 702, the method includes writing data from the read data field of the queue entry with the valid ready flag to the destination memory. This may include for example writing the address in the destination memory to be equal to the destination address field of the queue entry with the valid ready flag. As shown in block 704, the method includes marking the ready flag of the entry as invalid and marking the read discard flag as invalid. The process then may be repeated whenever there is data in the pending data queue.

Stated another way, during normal operation, the copy read controller 504 issues a read to a source memory location and queues that request in the pending data queue 502 with a ready flag 520 set to invalid and the read discard flag 526 set to invalid. The external memory 106 typically has a long latency. After the latency period, the external memory interface 116 returns the read result from the read request that was issued. The source read controller 500 writes the data that arrived from the read operation into the pending data queue entry and sets the ready flag 520 to valid. The copy write controller 508 finds the entry in the pending data queue that has the ready flag with a valid and therefore it writes the data that is in the entry in the pending queue to the destination memory.

To facilitate coherency, the copy read controller 504 issues a read to the source memory location and queues that request in the pending data queue 520. The external memory has a long latency as noted above. Before the data comes back from the external memory, if a new write operation arrives into the input request router 506 targeting the same memory location, the input request router 506 duplicates this write request and sends it to the copy write controller 508 as data 550. The copy write controller 508 searches the pending data queue 502 and determines that there is a pending read from the external source memory for the same location. If the source address of an entry in the pending data queue 520 matches the source address of the duplicated write request, the copy write controller 508 places the data contained in the duplicate write request into the read data field 518 of that entry and also sets the read discard flag 526 of that entry in the pending data queue 502 to valid so that when the read result arrives from the source memory at a later time, it will not trigger the writing of stale data into the pending data queue entry. When the external memory interface receives the read information as a result of the read request, the read data is written into the pending data queue only if the read discard flag 526 is not valid. When the external memory interface receives the read information as a result of the read request the ready flag is set to valid irrespective of the value of the read discard flag 526. The copy write controller finds the entry in the pending data queue that has the ready flag set to valid and writes the data from that pending data queue entry whose ready flag 520 is valid having been assured that no stale data from the source read controller has over-written any duplicate data in the pending data queue 520. The current entry now holds no data and is available to be reused by the copy read controller 504. As such, the copy write logic is operative to compare the address of the intercepted memory write request with the address of all entries in the pending data queue to facilitate copy coherency. The pending data queue 520 temporarily stores data copied from the external or source memory region and data representing that an entry in until the time that the copy write logic 508 is able to copy the data from the pending data queue 520 to the destination memory region. As opposed to using the pending data queue 502 as a type of buffer to temporarily store data to be copied, an immediate writing of data to the destination memory can be used that does not require the temporary storage in the pending data queue but the read discard flag is still employed. In an alternative method to facilitate coherency, the copy read controller 504 issues a read to the source memory location and queues that request in the pending data queue 520. The external memory has a long latency as noted above. Before the data comes back from the external memory, if a new write operation arrives into the input request router 506 targeting the same memory location, the input request router 506 duplicates this write request and sends it to the copy write controller 508 as data 550 and to the source memory interface shown in 162. The copy write controller 508 then sends the duplicated write 170 to the destination or internal memory interface 110. The copy write controller 508 also searches the pending data queue 502 and determines that there is a pending read from the external source memory for the same location. The copy write controller 508 sets the read discard flag 526 of that entry in the pending data queue 502 to valid so that when the read result comes in from the source memory at a later time, it will not trigger the writing of stale data into the destination memory 104. When the external memory interface receives the read information as a result of the read request, the ready flag is set to valid irrespective of the value of the read discard flag 526. The copy write controller finds the entry in the pending data queue that has the ready flag set to valid and the read discard flag also set to valid. This means that duplicate write has already been performed to the internal destination memory and therefore the data in the entry of the pending data queue is stale. The copy write controller 508 therefore discards the data of said entry of the pending data queue and resets the ready and the read discard flags 520 and 526. The current entry now holds no data and is available to be reused by the copy read controller 504. As such, the copy write logic is operative to compare the address of the intercepted memory write request with the address of all entries in the pending data queue to facilitate copy coherency. The pending data queue 520 temporarily stores data copied from the external or source memory region and data representing that an entry until the time that the copy write logic 508 is able to either copy the data from the pending data queue 520 to the destination memory region or to discard the data representing the entry whose read discard flag 526 is set and whose ready flag 520 is also set.

As noted above, the copy write logic 508 is operative to determine from the pending data queue whether there is a pending read request for the source memory corresponding to a same address as the write request based on producing the duplicated write request if so, the discard flag is set to valid for the entry.

The coherent memory copy logic is operative to perform the duplicate write immediately or the copy write logic inserts data from the duplicate write into the pending data queue. Also when copying data, copying includes reading an entry from a pending data queue when either (a) a ready flag is valid and a discard flag is INvalid and writing to the destination memory region, or (b) when the ready flag valid and a read discard flag is valid and where previously placed ]content of the duplicate write was previously placed in the pending data queue.

A partial internal memory only mode may also be employed where for example the software application may not be able to move all pages that it needs into the internal memory since the internal memory may be too small. In this case, the external memory usage may still be reduced by moving the most heavily used pages into the internal memory. In this partial internal memory only mode, memory pages that are accessed frequently by the processor 108 are placed into the internal memory. This decreases the access latency for the processor while reducing the number of accesses to the external memory. As such, the method may include determining which memory pages are accessed more frequently than others by a processor which may be done for example using software executing on the processor 108 and copying the more frequently used memory pages to the internal destination memory. In addition, the method includes producing an internal translation look aside buffer by storing a subset of information from the external translation look aside buffer located in the external source memory and searching the internal TLB before searching the external TLB to determine an address translation. The virtual to physical translations can be performed in several manners. One option is to use the external memory page-table for address translation. Another option is to use both the internal memory translation look aside buffer and the external memory page-table. Where this option is employed, the internal memory TLB is searched first. If the internal memory TLB does not contain the required translation, the external memory page-table is used to perform the search.

The software module executing on the CPU can identify pages that are good candidates for storage in the internal memory in an apriori manner based on use case. Alternatively, a dynamic page history buffer (not shown) can be placed into the memory controller block 122 to identify and count the most used memory pages within a given time period. The logic or executing software module 142 may then be used to use the content of the page history buffer to issue copy operations to the coherent memory copy logic.

It would be useful if the page copy work queue is a circular buffer so that batch operations may be used if desired. The coherent memory copy logic may also copy several pages in a sequential manner prior to notifying a software layer. If desired, copying multiple pages in parallel may also be carried out and performing burst reads or burst writes may be desirable depending upon the application.

As set forth above, a method for reallocating memory content includes providing continuous read and write access to an external source memory region while copying data from the external source memory region by, for example, continuing to run a current application that causes a memory write for the external source memory region. While the application is running, the method includes duplicating the write request for the external source memory region to produce a duplicated write request. The method includes executing the duplicated write request to copy content from the external source memory region to the internal destination memory region. The method also includes reducing power of the external memory that contains the external memory region in response to copying content to the internal destination memory region. As will be understood by those of ordinary skill in the art, while an examplary embodiment of a handheld or portable device was described heretofore, the embodiments of the invention may include such things as notebook and notebook computers, game consoles, other portable devices (e.g., portable gaming systems), desktop, workstation and server computers and others.

Also, integrated circuit design systems (e.g. work stations) are known that create integrated circuits based on executable instructions stored on a computer readable memory such as but not limited to CDROM, RAM, other forms of ROM, hard drives, distributed memory etc. The instructions may be represented by any suitable language such as but not limited to hardware descriptor language or other suitable language. As such, the logic (e.g., circuits) described herein may also be produced as integrated circuits by such systems. For example an integrated circuit may be created for use in a display using instructions stored on a computer readable medium that when executed cause the integrated circuit design system to create an integrated circuit that is operative to indicate, to an image source provider, wide gamut RGB indication information and wide gamut color format definition information for wide gamut RGB color data to be received in a multi-stimulus color space; receive wide gamut confirmation information from the image source provider; and display received wide gamut RGB color data that was received in response to the wide gamut RGB indication information and format definition information. Integrated circuits having the logic that performs other of the operations described herein may also be suitably produced.

A new type of DMA logic and method has been described that provides memory content coherency as part of a memory copy operation. The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A method for reallocating memory content comprising:
    copying data from a source memory region to a pending data queue;
    writing the data from the pending data queue to a destination memory region;
    executing a first write request to a source memory region;
    duplicating the first write request to produce a duplicated write request; and
    executing a second write request to copy content that is the subject of the duplicated write request from the source memory region to the destination memory region.

2. The method of claim 1 wherein the source memory is external memory and wherein the destination memory is internal memory and wherein the method comprises producing an internal translation look aside buffer (TLB) by storing a subset, or a modified subset, of information from an external translation look aside buffer (TLB) located in the external memory that contained physical addresses, to the internal TLB;
    using only the internal TLB for address translations for the destination memory region;
    stopping access to the source memory; and
    reducing power consumption of the source memory by placing the source memory in a low power mode.

3. The method of claim 2 wherein placing the source memory in a low power mode comprises placing the source memory in self refresh mode or removing power from the source memory.

4. The method of claim 1 comprising:
    determining which memory pages are accessed more frequently than others by a processor;
    copying the more frequently used memory pages to the destination memory, wherein the destination memory is internal memory; and
    producing an internal translation look aside buffer (TLB) by storing a subset or a modified subset of information from an external translation look aside buffer (TLB) located in the external source memory that contained physical addresses;
    searching the internal TLB before searching the external TLB to determine an address translation.

5. The method of claim 1 comprising:
    determining whether an entry in the pending data queue comprises a read request for the source memory corresponding to a same address as the first write request based on producing the duplicated write request; and
    if so, setting a discard flag for the entry to valid.

6. The method of claim 5 comprising performing the second write request in response to obtaining the first write request to the source memory region.

7. The method of claim 5 comprising inserting data from the duplicate write request into the pending data queue.

8. The method of claim 1 wherein the data is written from the pending data queue to the destination memory when either (a) a ready flag is valid and a read discard flag is invalid, or (b) when the ready flag is valid and the read discard flag is valid and where content of the duplicate write request was previously placed in the pending data queue.

9. A method for reallocating memory content comprising:
providing continuous read and write access to an external source memory region and copying data from the external source memory region to an internal destination memory region by:
continuing to run a current application that causes a first memory write request for the external source memory region;
duplicating the first write request for the source memory region to produce a duplicated write request;
executing a second write request regarding data that is the subject of the duplicated write request to ensure that the content from the source memory region is identical to the content of the destination memory region; and
reducing power of the external memory that contains the external memory region in response to copying content to the internal destination memory region.

10. The method of claim 9 comprising, prior to reducing power consumption of the external memory, producing an internal translation look aside buffer (TLB) by storing a subset or a modified subset of an entire translation look aside buffer (TLB) information located in the external source memory that contained physical addresses, to the internal TLB.

11. The method of claim 10 wherein producing the internal translation look aside buffer (TLB) prior to reducing power to the external memory comprises storing the subset of physical addresses as at least one of: a hardware search tree or a hash table.

12. An integrated circuit (IC) comprising:
coherent memory copy logic operative to copy data from a source memory region to a destination memory region and that is operative to duplicate an incoming first write request to the source memory region to produce a duplicated write request; and execute a second write request to synchronize content from the source memory region to the destination memory region,
wherein the coherent memory copy logic comprises input request router logic operative to intercept memory write requests for the source memory being copied to the destination memory region in destination memory, and copy write logic operative to compare an address of the intercepted memory write request with an entry in a pending data queue to facilitate copy coherency.

13. The IC of claim 12 wherein the pending data queue temporarily stores data to be copied from the source memory region and at least data representing that an entry in the pending data queue is ready to be copied to the destination memory region and data representing that an entry has been copied to the destination memory region.

14. The IC of claim 12 comprising an internal translation look aside buffer (TLB) that stores a subset or a modified subset of information from an external translation look aside buffer (TLB) located in the external source memory that contained physical addresses and memory interface logic that uses the internal TLB to translate physical addresses and virtual addresses for only pages stored in the internal memory.

15. The IC of claim 12 wherein the entry in the pending data queue comprises a pending read request for the source memory and the copy write logic is operative to:
determine from the pending data queue whether the entry comprising a pending read request for the source memory corresponds to a same address as the write request based on producing the duplicated write request; and
if so, setting a discard flag for the entry to valid.

16. The IC of claim 15 wherein the coherent memory copy logic is operative to perform the second write request in response to obtaining the write request to the source memory region.

17. The IC of claim 15 comprising copy write logic operative to insert data from the duplicate write into the pending data queue.

18. The IC of claim 12 wherein copying comprises reading an entry from the pending data queue and writing to the destination memory region when either (a) a ready flag is valid and a read discard flag is invalid, or (b) when the ready flag is valid and a read discard flag is valid and where content of the duplicate write was previously placed in the pending data queue.

19. A device comprising the integrated circuit of claim 12.

20. A device comprising:
an integrated circuit comprising internal memory thereon;
external memory, external to the integrated circuit;
logic operative to transfer operation from the external memory to the internal memory and operative, prior to reducing power of the external memory, to produce an internal translation look aside buffer (TLB) by storing a subset or modified subset of information in an entire translation look aside buffer (TLB) located in the external source memory that contains physical addresses, to the internal TLB; and operative to reduce power of the external memory;
wherein the logic comprises coherent memory copy logic that comprises input request router logic operative to intercept memory write requests for source memory being copied to the destination memory region, and copy write logic operative to compare an address of the intercepted memory write request with an entry in a pending data queue to facilitate copy coherency.

21. The device of claim 20 wherein the pending data queue temporarily stores data to be copied from the source memory region and at least data representing that an entry in the pending data queue is ready to be copied to the destination memory and data representing that an entry has been copied to the destination memory region.

22. The device of claim 20 wherein the copy write logic is operative to determine whether there is a pending read request for the source memory corresponding to a same address as the write request; and
if so, setting a discard flag for the entry to valid.

23. A non-transitory computer readable medium comprising:
executable instructions stored thereon that when executed cause an integrated circuit design system to create an integrated circuit that is operative to reallocate memory content by:
copying data from a source memory region to a pending data queue;
writing said data from the pending data queue to a destination memory region;

executing a first write request to a source memory region;

duplicating the first write request to the source memory region to produce a duplicated write request; and executing a second write request to copy content that is the subject of the duplicated write request from the source memory region to the destination memory region.

24. The computer readable medium of claim 23 wherein the executable instructions represent hardware descriptor language instructions.

25. The method of claim 1, further including sequentially processing entries of copied data that are temporarily stored in the pending data queue.

26. The method of claim 1, wherein the second write request is based on the duplicated write request.

* * * * *